United States Patent

[11] 3,602,142

| [72] | Inventors | Pierre Bigeon<br>Meudon;<br>Rene Berroir, Fresnes; Jacques Raymond Raynaud, Savigny-sur-Orge; Georges Malefond, Montreuil-Sous-Bois; Jacques Leys, Villejuif; Claude Nee, Antony, all of, France |
| --- | --- | --- |
| [21] | Appl. No. | 862,311 |
| [22] | Filed | Sept. 30, 1969 |
| [45] | Patented | Aug. 31, 1971 |
| [73] | Assignee | Nord-Aviation Societe Nationale de Constructions Aeronautiques Paris, France |
| [32] | Priority | Oct. 2, 1968 |
| [33] | | France |
| [31] | | 168,498 |

[54] CONTACT-TYPE ACTUATING SAFETY DEVICE
7 Claims, 8 Drawing Figs.

[52] U.S. Cl..................................................... 102/4,
89/1.5 D, 102/70.2, 102/81
[51] Int. Cl. .................................................... F42b 25/02
[50] Field of Search........................................... 102/4, 7.4,
70, 70.2, 81; 114/20; 294/83; 244/147–150;
89/1.5 D

[56] References Cited
UNITED STATES PATENTS

| 2,441,133 | 5/1948 | Brady............................ | 102/4 X |
| 3,709,961 | 6/1955 | Klas............................. | 102/4 |
| 3,122,392 | 2/1964 | Benditt et al. ................ | 102/4 X |

*Primary Examiner*—Samuel W. Engle
*Attorney*—Karl W. Flocks

ABSTRACT: A device for triggering a safety sequence such as the release of a parachute from the load which was suspended from it, at the time of impact of the ground.

When the load is dropped from the aircraft, the parachute deploys and causes the valve of a gas reservoir to be opened. The gas fills an expansion chamber and, when the pressure becomes sufficient, acts on a first safety latching system controlling a second electrical safety system.

When the load reaches the ground, a sensor is actuated and makes the second electrical safety system to be activated.

This latter makes an explosively separating system to be worked whereby the parachute is released from the load.

CONTACT-TYPE ACTUATING SAFETY DEVICE

In its broader aspects the present invention relates to a contact-type actuating safety device permitting, from any chosen moment onwards, the detection and conversion into electrical energy of any predetermined threshold-exceeding relative displacement between two elements, of which one is rigid with the device itself and the other responsive to the behavior of the sensor thereon, for instance to the position thereof. The electrical energy furnished by the safety device when it operates can then be used, depending on the particular application for which the device is employed, in the form of the most convenient of the effects which the electrical energy can produce, examples being the thermal effect (lighting, ignition of a detonator, etc.) or the magnetic effect (relays, motors, etc.).

It is to be noted that in various applications in which a specific action is triggered responsively to a relative motion between two elements—through the agency of a suitable device—it is invariably desirable:

- to be able to render the device active only from a deliberately chosen moment onwards, which is to say that until that moment said device shall remain inert or inoperative, and this irrespective of any mechanical, climatic or electrical stresses it may undergo;
- that the device be sensitive to any kind of movement, regardless of the direction of the space along which such movement occurs;
- that utilization of the device be simple and straightforward and that it be possible to neutralize it rapidly, reliably and safely during the phase when it is armed;
- and that operation of the device be autonomous and, more particularly, not dependent upon an external source of energy of any kind.

The contact-type actuating safety device according to this invention embodies all the qualities set forth above and can be used with advantage to ensure any triggering action consecutive either to a relative movement between two elements or two solids, or to mutual contact therebetween.

Thus, the subject device of this invention is most notably applicable in the following cases:

- For setting off an explosive device such as a mine, bomb, etc. responsively to a contact pressure exerted upon the device's sensor, for instance following a crushing effect, a shock or a pull exerted laterally in any direction.
- For triggering a signal either in the case of accidental relative motion between two elements, objects or solids which should normally remain fixed relative to each other, such as the foundations of a building or a pylon relative to the ground, or in the case of excessive deformation of an element in relation to another, such as that of a beam relative to a framework.
- For triggering an action following an impact on the device, or, conversely, the impact of a body containing the device against another body, an example being the separation of a parachute from the load suspended therefrom, at the instant of impact on the ground.

It goes without saying that the above-listed examples are by no means limitative, being intended merely for the purpose of giving a better understanding of the possibilities of application of the subject device of the present invention.

More specifically, this invention relates to a device for initiating an action through contact, that eliminates all risk of accidental operation and ensures great reliability, is impervious to any mechanical or climatic stresses before it is armed at the deliberately chosen opportune moment, is self-contained, simple and reliable, and neutralization of which in the "armed" configuration is easy and safe.

In order to give a clearer understanding of the invention, a description will be given hereinafter of an exemplary nonlimitative application to the separation, at the moment of impact on the ground, of a parachute from the load which was suspended from it. This particular application highlights the advantages of the device according to the invention, but because of its complexity it is thought useful to first give a detailed preamble.

In all instances where a load is parachuted from an aircraft, it is desirable to obtain separation of the parachute (s) as soon as touchdown occurs so as to prevent the load from being dragged along the ground by the wind, which prevents the parachute from collapsing and thereby generates a force capable more often than not of dragging the load along until it jams against some obstacle such as a tree, a rock or a house for example. Since, save in exceptional cases, parachuting sites are clear of obstacles, there is a considerable risk of having the load damaged or even destroyed while it is dragged along the ground by the wind. Further, precision parachuting as such becomes illusory if, upon reaching the ground at the desired place, the load is dragged in a random direction determined alike by the direction of the wind and by terrain irregularities, over a distance which depends solely on the position of the obstacle ultimately encountered by the load in relation to the initial touchdown point.

Many prior art systems operate on the principle of having parachute release triggered by the fact that the tension in the parachute shroud lines, which is equal to the weight of the burden during descent through the atmosphere, is theoretically nulled at touchdown since the burden is arrested and the parachute no longer has to support it. But, in cases precisely where a ground wind is blowing, the parachute fails to deflate and turns into the wind, as a result of which tension in the shroud lines is not cancelled and the releasing device fails to operate. From this standpoint, then, such prior art devices will operate in the absence of wind but become unreliable when a wind is blowing, as is most often the case.

Further, pressure release systems must possess great reliability, since accidental functioning of the system during the descent through the atmosphere would cause free falling of the burden and its destruction upon impact with the ground. In order to successfully achieve maximum reliability, the device in question must eliminate all risk of accidental operation due to the jerk caused by deployment of the parachute after the drop is made from the aircraft, to random movement of mobile portions of the burden, leading, in certain special cases, to their being freed from the burden during the parachute-controlled descent through the atmosphere, or to interference from electric circuits in specific instances where the burden is a complex system comprising electricity generators (batteries) for its own operation and in which these generators supply the electric power needed to activate the parachute release device (in cases where such device is of a type requiring a supply of electric current for its operation).

The motion-sensing triggering device according to this invention provides an unusually simple and elegant solution to the problem discussed above, but, in its broader aspects, is applicable to a great many other cases as well.

Essentially, it is characterized by the fact that it comprises in combination:

- means for using the phenomenon detected by the sensor (in this instance means for explosively separating the parachute (s) from the suspended load), said means operating without an electrical energy input;
- a percussion-activatable self-contained source of electric power;
- percussion means for activating the source of electric power;
- a first safety latching system for said percussion means (referred to as the "arming device"), powered by a pneumatic system which, in this exemplary application, may be time-delayed with advantage;
- a second latching system for said percussion means (referred to as the "operating device") and an electric switch to short circuit the means for using the detected phenomenon (in this instance activation of the explosive means), both powered by a sensor actuated by the detected phenomenon (in this instance impact of the load on the ground) whereby to release the percussion means and actuate the electric switch;

and a reservoir of compressed or liquefied dehydrated gas, opening of which is controlled manually or by any other convenient means (in this instance by the movement of the parachute when the drop is made from the aircraft), the gas from which then operates on the arming device, possibly through the agency of the time-delayed pneumatic system, which system may be of the expansion-chamber type with advantage.

Other advantages and features of the present invention will emerge from the description given with reference to the accompanying nonlimitative exemplary drawings of a possible embodiment of a sensing-triggering device according to the invention, in the case of application thereof to the separation of a parachute, from the burden which was suspended therefrom, at the moment of impact on the ground.

Figure 1:
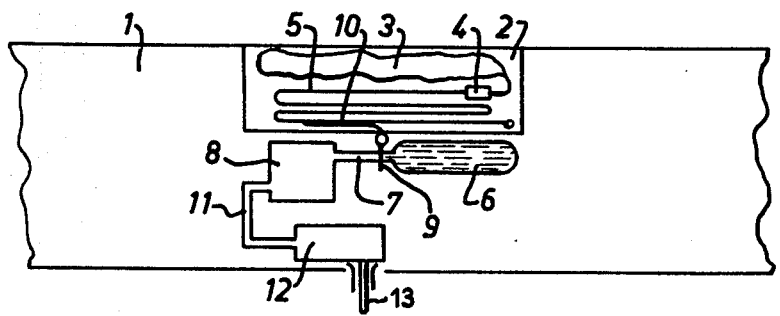
FIG. 1 shows the entire triggering device according to the invention in its neutral configuration, i.e. the burden and the device, prior to dropping thereof from the aircraft.

In FIG. 1, general reference numeral 1 designates any load to be parachuted. In a compartment 2 provided in said load are contained: the parachute 3, the explosive separating device 4 and the shroud lines 5 attaching the load 1 to parachute 3. Likewise provided in the load is a compressed or liquefied dehydrated-gas reservoir 6, in the form say of a bottle of $CO_2$, connected through a conduit 7 to an expansion chamber 8. Conduit 7 is initially obturated by suitable means 9, themselves connected by a cable 10 to the shroud lines 5 attaching the burden to the parachute. Expansion chamber 8 is connected via a conduit 11 to the mechanical unit 12 proper, to which reference in greater detail will be made hereinafter. At the bottom of said unit is disposed a sensor 13 protruding from the underface of burden 1.

Figure 2:
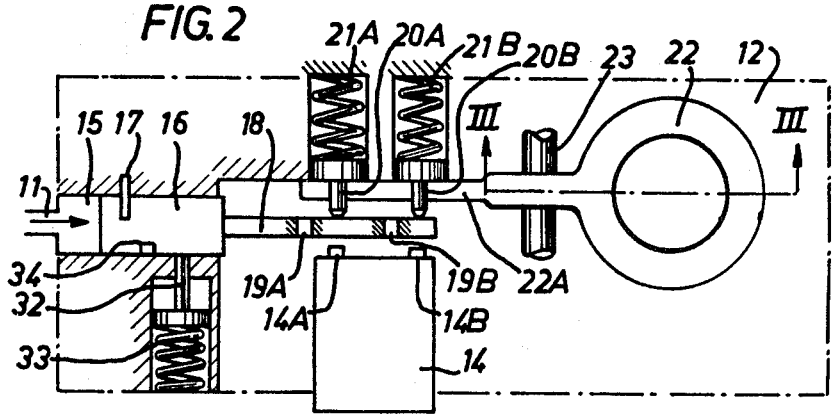
FIG. 2 is a diagrammatic showing, on an enlarged scale, of the mechanical unit of the tripping device in its neutral configuration, i.e. in its state shown in FIG. 1.
Figure 3:
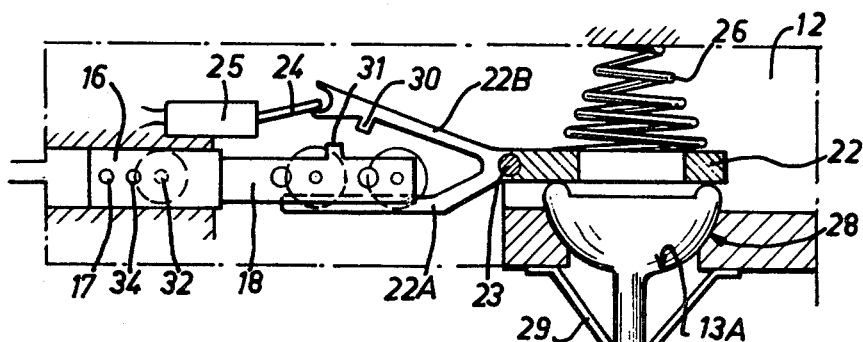
FIG. 3 is a side elevation view of the mechanical unit, in partial section taken through the line III—III of FIG. 2.

The mechanical unit proper, of which a possible embodiment is portrayed in FIGS. 2 and 3, basically includes a housing 12 shown in dot-lash lines and enclosing a self-contained electric power source such as a percussion-activatable battery 14 capable of supplying, at the opportune moment as will be explained in detail later, the energy required to operate the explosive separation device 4. Additionally provided in unit 12 is a cylinder 15 into one end of which conduit 11 has port and within which is slidable a piston 16 which is locked in the "striker latched" position by a shearpin 17. Piston 16 comprises an extension 18 embodying two orifices 19A and 19B which extend right through it and to the primers reference will be made in greater detail hereinafter. Facing the primers 14A and 14B of battery 14 are two strikers 20A and 20B powered by springs 21A and 21B respectively. During the neutral configuration, i.e. before the burden 1 is dropped from the aircraft, as shown in FIGS. 1, 2 and 3, strikers 20A and 20B are restrained in the armed position, firstly by the piston extension 18 upon which they bear and, secondly, by the lower limb 22A (referred to as the "trigger") of a substantially Y-shaped lever 22 laid horizontal and articulated about a pin 23. The end of the upper limb 22B of lever 22 controls the actuating arm 24 of an electric switch 25 which, in its neutral position shown in FIG. 3, shorts out the primer of the explosive device 4 which separates the load 1 from its parachute 3 at the opportune moment (to be described in detail hereinafter).

The rear portion of lever 22, which in the exemplary embodiment illustrated is of circular shape, is urged by a volute spring 26 against the top of a sensor 13 formed with a spherical head 13A which is retained, in a matching seat 28 in the housing, in such manner as to cause the tip of sensor 13 to protrude from the underface of burden 1, as clearly shown in FIGS. 1 and 3. Sensor 13, which is initially in its inoperative position shown in FIGS. 1 and 3, is restrained laterally by a hollow cone 29 made of deformable material which is secured to housing 12 and the effect of which is to prevent said sensor from reverting to its inoperative position once it has been displaced. Manifestly, any movement of sensor 13, either along its own longitudinal axis or in any other direction, will cause lever 22 to rock about its hinge pin 23. The consequences of such rocking motion are described in greater detail hereinafter.

Upper limb 22B of lever 22 carries on its underface a stud 30 capable of abutting, upstream or downstream as the case may be, against a stud 31 carried on the upper face of the extension 18 of piston 16.

Figure 5:
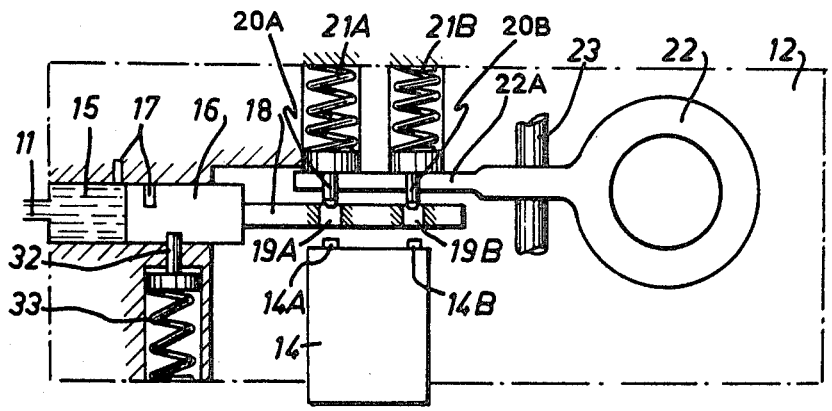
FIG. 5 is a view corresponding to FIG. 2 showing the mechanical unit of the triggering device in its armed configuration (provoked state) after movement of the strikers-latching piston, i.e. in its configuration in the stage shown in FIG. 4.
Figure 6:
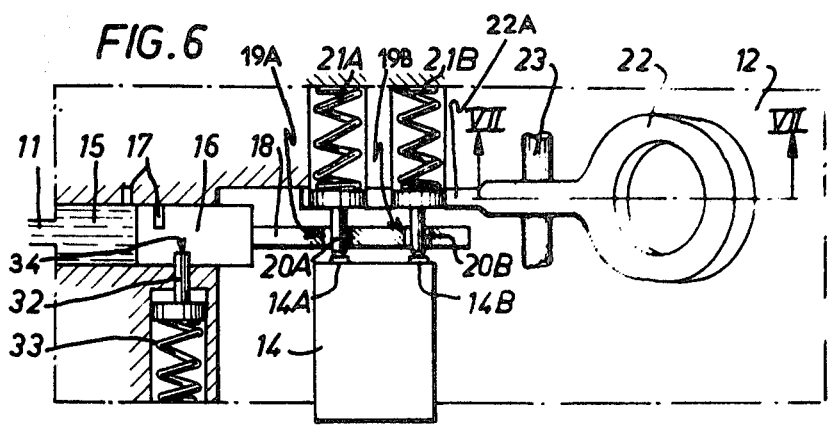
FIG. 6 is a view corresponding to that of FIG. 5, showing the mechanical unit of the triggering device in its operating configuration (provoked state), i.e. following movement of the sensor due to the detected phenomenon (in this instance after impact of the burden on the ground)

The mechanical unit further includes means for latching piston 16 in the armed position as shown in FIGS. 5 and 6, to which reference in greater detail will be made hereinafter. These latching means may be formed with advantage by a plunger 32 biased by a spring 33 and capable of engaging into an indent 34 formed on piston 16.

For a clearer understanding of the invention a description will now be given of the various operating stages of the subject separating device thereof.

During the initial stage, i.e. prior to dropping of the load from the aircraft, the mechanical unit is in the configuration shown in FIG. 1, 2 and 3.

In this configuration the primer of explosive device 4 is shorted out by electric switch 25, the gas reservoir 6 is obturated by the system 9, the strikers 20A, 20B are locked firstly by the safety extension 18 of piston 16 and secondly by the trigger 22A of lever 22, motion of which is governed by the motion of sensor 13, and the battery 14 is inert, i.e. it provides no output by its very nature.

Figure 4:
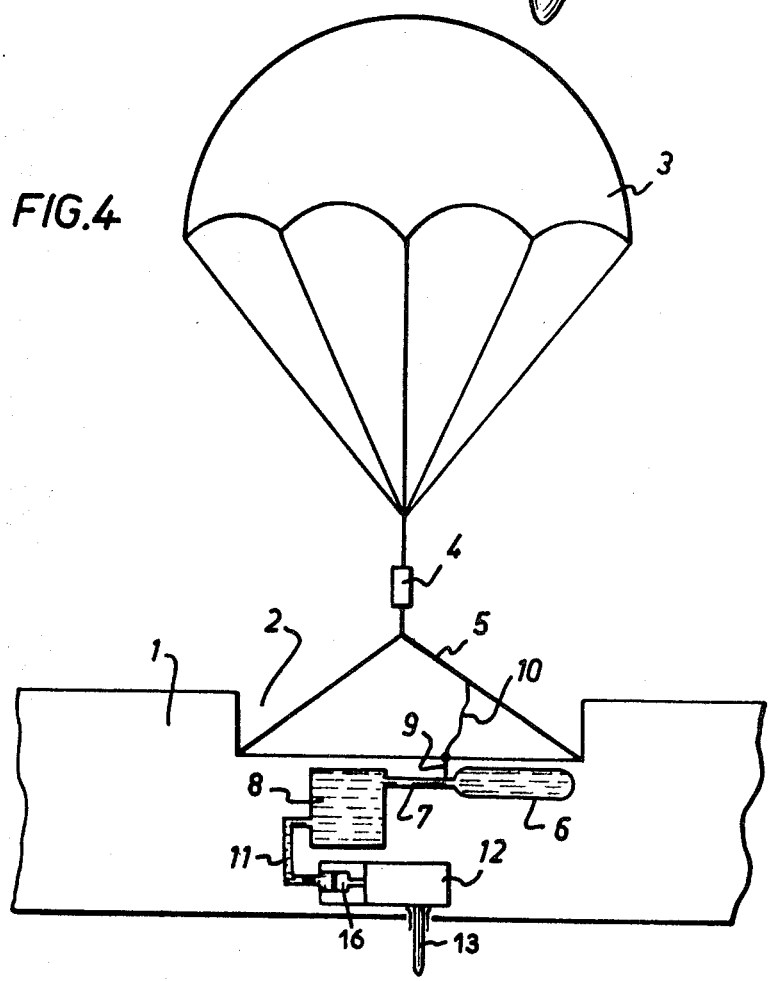
FIG. 4 is a diagrammatic portrayal on a reduced scale of the entire triggering device in its armed configuration (provoked state) and of the burden during the stage when both are suspended from the parachute.

When the load 1 is dropped from the aircraft (see FIGS. 4 and 5) the parachute 3 deploys and, as they uncoil, the shroud lines 5 cause, through the medium of cable 10, withdrawal of the obturating means 9 and opening of gas reservoir 6. The latter then fills expansion chamber 8 and, at the end of a time lapse dependent upon the volume thereof, the pressure becomes sufficient to act on piston 16 and cause the pin 17 to shear. Piston 16 then advances into the armed position, in which it is locked once more by the plunger 32 as the same engages into indent 34 responsively to spring 33. In this position the strikers 20A, 20B register with the orifices 19A, 19B in extension 18 and at this point are therefore latched only by the trigger 22A of lever 22 constituting the second, so-called "operating" latching system.

Figure 8:
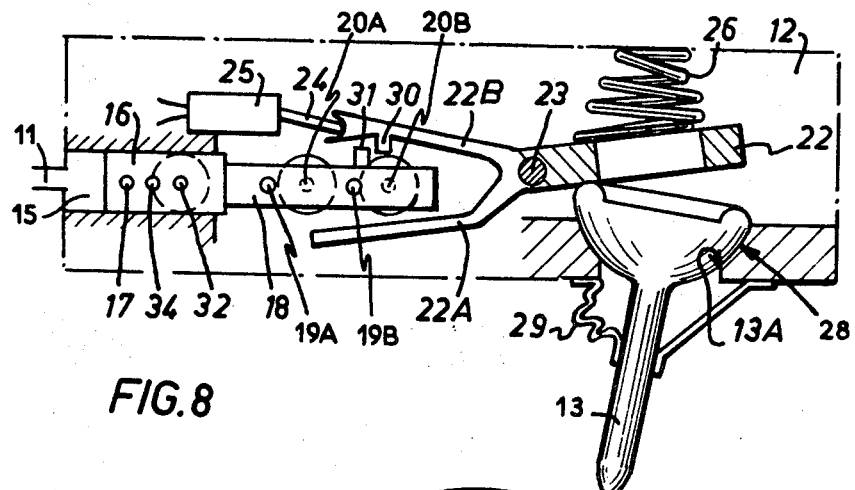
FIG. 8 is a view corresponding to FIG. 7, showing the mechanical unit of the triggering device in the configuration it assumes if, for any reason, the sensor is actuated before the mechanism is armed.

It should be noted that between the moment the drop is made from the aircraft and the moment piston 16 shifts to release the first safety latching of strikers 20A and 20B, it is possible to release from the load certain movable parts thereof which, should they accidentally impinge upon the sensor 13, would cause piston 16 to be locked in the "striker latched" position, as is clearly shown in FIG. 8. Reference to this figure shows that, in causing the lever 22 to rock, sensor 13 fetches the stud 30 on upper limb 22B into downstream contact with the stud 31 on the extension 18 of piston 16, thereby preventing further motion of piston 16. The mechanism is thus deactivated and obviates any risk of accidental operation of the explosive separation system.

Otherwise than in this special contingency, strikers 20A and 20B are armed as the load-parachute assembly sinks through the atmosphere but are still fixedly restrained by the trigger 22A of lever 22 by reason of the fact that sensor 13 is still in its inoperative position. In the course of this phase the primer of explosive device 4 continues to be short circuited and the battery 14 remains inert (see FIG. 5).

Figure 7:
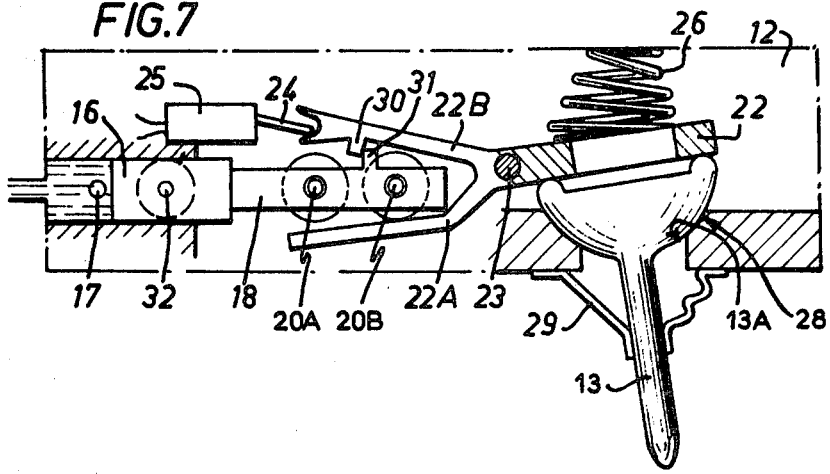
FIG. 7 is a side elevation view of the mechanical unit of the triggering device, in partial section along the line VII—VII of FIG. 6.

When the load 1 impacts the ground and irrespective of the direction of its descent (see FIGS. 6 and 7), sensor 13 is shifted and, under the effect of the shock, distorts the hollow cone 29 holding it in position. This movement of sensor 13 causes lever 22 to rock against the countering effect of spring 26.

In rocking, lever 22 causes:

1. actuation, through the tip of its limb 22B, of the arm 24 of electric switch 25 and deshort circuiting of the primer of explosive separation device 4;

2. releasing, through retration of trigger 22A, of the strikers 20A and 20B which, responsively to springs 21A and 21B, extend through the orifices 19A and 19B and strike the primers 14A and 14B on battery 14. The electric current then delivered by the battery activates the explosive device and the parachute 3 is released from load 1.

Clearly, the battery and/or the strikers can be so chosen and devised respectively as to predetermine the time-lapse between the instant of percussion of the battery primers and the instant at which the battery begins to deliver current.

It goes without saying that many detail changes may be made in the exemplary nonlimitative embodiment of the present invention hereinbefore described without departing from the scope thereof.

In particular, the time interval elapsing between the instant of displacement of the piston 16 which latches the strikers 20A and 20B and the instant at which the load is dropped from the aircraft can be determined at will be operating on the following parameters:

the diameter of the pin 17 restraining piston 16,
the nature of the material used for said pin,
the diameter of the forward end of piston 16 which receives the pressure of the gas issuing from expansion chamber 8,
the volume of the expansion chamber,
the diameter of the conduits 7 and 11 interconnecting gas reservoir 6 with expansion chamber 8, on the one hand, and said chamber with cylinder 15, on the other, and
the pressure and volume of the gas trapped in reservoir 6.

We claim:

1. A device for triggering a safety sequence such as the release of a parachute from the burden which was suspended from it at the time of impact on the ground, the triggering being caused by the detection, by the sensor on the device, of a phenomenon such as the relative displacement occuring between the element containing the device and any other distinct element with which it is capable of coming into contact, said safety triggering device comprising, in combination:

means for using the phenomenon detected by the sensor on the device;
a self-contained source of electric power activatable by percussion;
percussion means for activating the source of electric power;
a first safety system for latching said percussion means in the armed position;
said first system being powered by a pneumatic system into which an adjustable time-delay device is integrated;
a second safety system for latching said percussion means in the operating position;
an electric switch which normally short circuits the means for activating said means for using the detected phenomenon;
said second safety system and said electric switch being both powered by said sensor system which is itself subjected to the action of the detected phenomenon;
and a controlled-opening-type reservoir of compressed dehydrated gas;
the compressed gas contained in said reservoir acting on said first safety system through the agency of said time-delay device formed by an expansion chamber.

2. A safety triggering device as claimed in claim 1, wherein said first safety system for latching said percussion means in the armed position is formed by a piston provided with a shoulder thereon against which said percussion means bear, said piston being immobilized in this latching position by a restraining shearpin, and, after the action of said dehydrated gas under pressure issuing from said reservoir has sheared said restraining pin, being fetched into a position wherein said percussion means disengage from said shoulder on said piston and wherein the latter is immobilized anew by a spring-loaded plunger.

3. A safety triggering device as claimed in claim 1, wherein the second safety system latching said percussion means in the operating position is formed by a lever having two limbs, of which one acts as a trigger and restrains the powering means for said percussion means and the other operates said electric switch whereby to deshort circuit said actuation means of the means for using the detected phenomenon.

4. A safety triggering device as claimed in claim 1, wherein said sensor system is formed by a projecting stub capable of moving, responsively to the phenomenon to be detected, in any direction by virtue of a spherical bearing and elastic biasing means, said sensor system being so devised as to actuate both said second safety system and said electric switch as soon as it is displaced in any direction.

5. A safety triggering device as claimed in claim 4, wherein said ball-joint-mounted stub forming the sensor is immobilized in its neutral position by a hollow cone made of a material which deforms under the effect of displacement of the sensor and prevents the latter from reverting to its neutral position after it has moved.

6. A safety triggering device as claimed in claim 2, wherein the time interval elapsing between the instant of opening of said compressed dehydrated-gas reservoir and the instant at which said percussion means latching piston moves responsively to said pressurized gas is predetermined at will by operating on the parameters constituted by the diameters of the restraining pin, of the latching piston proper, of the expansion chamber and of the conduits.

7. A device for triggering a safety sequence upon detection by the device of any relative movement between the element enclosing the device and any other distinct element with which it is capable of coming into contact, said safety triggering device comprising, in combination:

a sensor system formed by a projecting orientable stub capable of being displaced, responsively to the phenomenon to be detected, in any direction by virtue of a spherical bearing and elastic biasing means;
means for using the phenomenon detected by said sensor;
a self-contained source of electric power which can be activated by percussion with an adjustable timelag;
percussion means for activating said source of electric power;
a controlled-opening reservoir of compressed dehydrated gas;
a first safety system for latching said percussion means in the armed position, formed by a piston embodying a shoulder against which said percussion means abut;
said piston being powered by a pneumatic system into which a time-delaying expansion chamber is integrated, said pneumatic system being supplied with said compressed dehydrated gas contained in said reservoir;

a restraining shearpin for holding said piston in the percussion means latching position until said pin is sheared by the action of said compressed dehydrated gas;

an electric switch for short circuiting the activation means of said means for using the phenomenon detected by said sensor;

and a second safety system for latching said percussion means in the operating position, formed by a lever having two limbs, of which one actuates said electric switch and the other latches the means powering said percussion means;

said two-limbed lever of the second safety system being powered by said sensor system and so devised in relation to said piston of the first safety system that should the two-limbed lever rock over for any reason before the piston shifts from its latching position, it definitively locks the piston in its percussion means latching position, whereby the safety triggering device is rendered inoperative.